Figure 1:
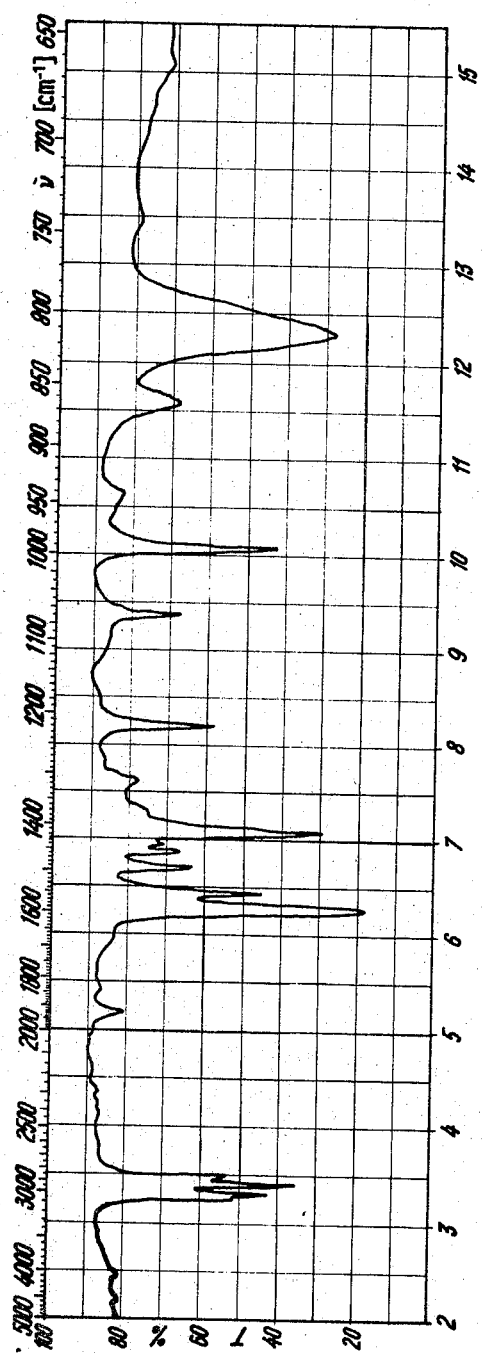

INVENTORS
PAOLO LONGI
IVANO WALTER BASSI
FRANCESCO GRECO
MARIO CAMBINI

United States Patent Office 3,338,907
Patented Aug. 29, 1967

3,338,907
CYCLIC TRIMER OF 4-VINYLPYRIDINE
Paolo Longi, Milan, Ivano W. Bassi, Cologno Monzese, Milan, Francesco Greco, Milan, and Mario Cambini, Montecatini, Terme, Pistoia, Italy, assignors to Montecatini Edison S.p.A., Milan, Italy
Filed Mar. 1, 1965, Ser. No. 436,201
Claims priority, application Italy, Mar. 2, 1964, 4,464/64
12 Claims. (Cl. 260—290)

This invention relates to a new cyclic head-to-tail trimer of 4-vinylpyridine, sym-tri-(4-pyridyl)cyclohexane, and to the process for its preparation.

It has previously been shown that, while the coordinate anionic polymerization of 2-vinylpyridine will lead to the formation of crystallizable macromolecules, any type of polymerization of 4-vinylpyridine leads to the formation of only non-crystallizable high polymers (G. Natta, G. Mazzanti, P. Longi, G. Dall'Asta, F. Bernardini, J. Polymer Sci., 51, 417 (1961)).

It has now surprisingly been observed that among the degradation products of poly-4-vinylpyridine, whether obtained by means of radical or anionic polymerization, a crystalline substance is present, the chemical structure of which corresponds to that of sym-tri(4-pyridyl)cyclohexane, i.e. of a cyclic head-to-tail trimer of 4-vinylpyridine. The formation of a cyclic trimer by degradation of linear macromolecules having a hydrocarbon chain has never been known previously.

Furthermore, it has been observed that the transformation of the linear polymer into the cyclic trimer occurs with particularly high yields when the degradation is carried out at a temperature of from 250–300° C., using a salt of the polymer in place of the free polymer (e.g. poly-4-vinylpyridinium hydrochloride).

The instant process for the preparation of the trimer of 4-vinylpyridine comprises (a) the preparation of a 4-vinylpyridine polymer; (b) the preparation and degradation of the poly-4-vinylpyridinium hydrochloride; and (c) the isolation of the cyclic trimer from the degradation products.

The cyclic trimer of 4-vinylpyridine, when mixed with polyolefins, increases their affinity towards dyestuffs, particularly acid ones considerably.

The following example is given to illustrate the present invention, without limiting it in any way.

EXAMPLE (a) *Preparation of poly-4-vinylpyridine in the presence of coordinate anionic catalysts.*—Into a 250 cm.$^3$ three-necked flask, provided with a stirrer, dropping funnel and thermostatic bath which is maintained at a temperature of 60° C., 2.2 g. of $(C_2H_5)_2$ NMgI and 100 cm.$^3$ of anhydrous toluene are introduced under nitrogen atmosphere. After 15 minutes stirring a solution containing 20 g. of anhydrous 4-vinylpyridine recently distilled in 50 cm.$^3$ of anhydrous toluene is slowly added by means of the dropping funnel. Then the entire mixture is stirred at 60° C. for 5 hours. Finally, 5 cm.$^3$ of butanol are added, the whole is poured into a 3–1 separating funnel and 1 liter of water and about 30 cm.$^3$ of concentrated HCl are added; the toluene phase is removed; 800 cm.$^3$ of chloroform and then, slowly and under stirring, a solution containing 30 g. of $NH_4Cl$ and 150 cm.$^3$ of concentrated $NH_3$ in 400 cm.$^3$ of water, are added to the aqueous phase.

The lower phase consisting of a chloroform solution of the poly-4-vinylpyridine, is evaporated until it reaches a volume of 30–50 cm.$^3$ and then poured into about 500 cm.$^3$ of n-heptane.

The separated polymer is dried at 100° C. and 20 mm. Hg; it amounts to 15.5 g. and has an intrinsic viscosity, in dimethylformamide at 30° C., of 0.3·100 cm.$^3$/g.

(b) *Preparation and degradation of the poly-4-vinyl-pyridinium hydrochloride.*—In a 500 cm.$^3$ flask, 15.5 g. of poly-4-vinylpyridine are dissolved in 250 cm.$^3$ of chloroform and treated with gaseous hydrochloric acid at room temperature, under stirring, until no more absorption of hydrochloric acid is observed. The white precipitate is dried under a reduced pressure of 1–2 mm. Hg at 50–60° C.

The poly-4-vinylpyridinium hydrochloride thus obtained is heated by means of a bath of Wood alloy, at a temperature of 280° C. for 3 hours at a reduced pressure of 14 mm. Hg. During this operation a considerable formation of hydrochloric acid and 4-vinylpyridine occurs. Moreover, the condensation of semisolid products having an intense green color, on the cold parts of the flask, is observed.

(c) *Separation of the crystalline product.*—The final degradation product is dissolved in 100 cm.$^3$ of chloroform and treated twice, in a separating funnel, first with aqueous ammonia and then with distilled water, until the $Cl^-$ ions have disappeared from the washing liquids. The chloroform solution is then dehydrated (by removing at the boiling point the azeotropic mixture of chloroform and water) and then 300 cm.$^3$ of n-heptane is slowly added, while stirring. A semisolid product, prevailingly consisting of low molecular weight linear 4-vinylpyridine polymers, is separated. From the remaining solution, a light yellow crystalline product, prevailingly consisting of the 4-vinylpyridine trimer, is then separated by means of addition of 600 cm.$^3$ of n-heptane. After filtration and drying the yield is 9.5 g.; it is then crystallized from methylethylketone in order to purify it. (When using 23 g. of poly-4-vinylpyridine obtained by means of radical polymerization (initiator: azobis-isobutyronitrile employed at a temperature of 80° C.) and carrying out the process described in (b) and (c), 8.2 g. of free crystalline product are obtained.)

The product crystallized from methylethylketone melts at 228.5° C., is soluble in chloroform, methylenechloride, aromatic hydrocarbons, alcohols and ketones, slightly soluble in ethyl ether, and insoluble in cold aliphatic or cycloaliphatic hydrocarbons. Analysis reveals a nitrogen content of 13.03% (calculated on 4-vinylpyridine: 13.32%). The molecular weight, cryoscopically determined in nitrobenzene, is 312.

The 4-vinylpyridine trimer (calculated molecular weight is 315.4) has a cyclic structure. In deed, if a linear structure is presumed, the trimer should possess groups such as $—CH_3$ or $—CH=CH—$ of $>C=CH_2$. To the contrary, when examining the infrared absorption spectrum of the trimer in the molten state (FIG. 1: the transparency in percent is shown on the ordinate and the wave length in microns is shown on the abscissa) it is impossible to discover the presence of bands attributable to the above mentioned groups. The exact position of the absorption bands characterizing the above mentioned groups (7.25$\mu$ for $—CH_3$, 10.34$\mu$ for $—CH=CH—$ trans and 11.07$\mu$ for $>C=CH_2$) has been derived from examination of the infrared absorption spectra of 4-picoline, 4-propenylpyridine (trans), and 4-isopropenylpyridine. In this connection, it is to be noted that the weak band at 7.28$\mu$ of FIG. 1 is not due to the presence of methyl groups, but is characteristic of the pyridine nucleus. (G. Zerbi, B. Crawford, J. Overend, J. Chem. Phys., 38, 127 (1963)).

Figure 2:
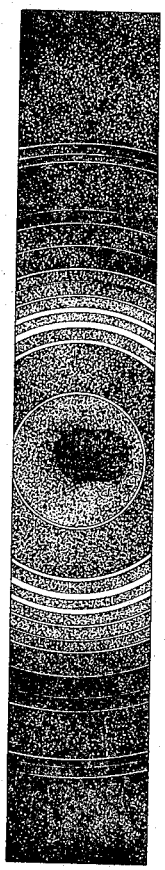

Therefore, it is seen that the trimer has a cyclic structure corresponding (adopting the very likely hypothesis of a head-to-tail enchainment of the monomeric units) to that of sym-tri(4-pyridyl) cyclohexane. Confirmation of the correctness of this hypothesis is given by X-ray examination (see FIG. 2 showing the diffraction spectrum (CuKα) of sym-tri(4-pyridyl) cyclohexane in the solid state).

More particularly, the interpretation of the diffraction spectrum by means of X-rays carried out on the trimer in the solid state gives a rhombohedral unit cell wherein the constants referred to a hexagonal system of axes are:

$$a=b=17.50\pm0.10 \text{ A.}$$
$$c=4.65\pm0.05 \text{ A.}$$

(most probable space group $R_3$).

Since three molecules of the trimer are present in each cell, it is calculated that its density is 1.27 g./cm.³, a value close to the experimentally determined value of 1.28 g./cm..

On the basis of a consideration of the symmetry of the elementary cell and of the possibilities of packing of the molecules, it is concluded that a cyclic structure is to be attributed to the trimer, and that the three pyridine nuclei must be arranged in the equatorial belt of the cyclohexane "chair" configuration:

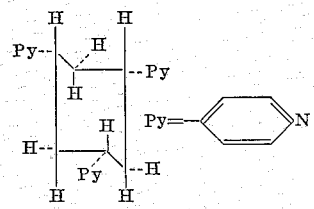

Moreover, the calculations of the structure factors, based on the steric configuration illustrated above, have led to a good agreement between the observed intensities, and those calculated, in the diffraction spectrum of the trimer in the solid state.

Having described the invention, what it is desired to secure and claim by Letters Patent is:

1. Sym-tri(4-pyridyl)cyclohexane.
2. Crystalline sym-tri(4-pyridal) cyclohexane.
3. Sym-tri(4-pyridyl)cyclohexane having a melting point of 228.5° C., a molecular weight of 312, and a rhombohedral unit cell, wherein constants referred to the hexagonal system of axes are $$a=17.5\pm0.10 \text{ A.};$$
$$b=17.5\pm0.10 \text{ A.};$$
$$c=4.65\pm0.05 \text{ A.}$$

4. A process for the preparation of sym-tri(4-pyridyl) cyclohexane, wherein a salt of a 4-vinylpyridine polymer is thermally degraded at a temperature between 250° and 300° C., then isolating the trimer by means of fractional precipitation.

5. The process of claim 4, wherein the fractional precipitation takes place from an alcoholic solution.

6. The process of claim 4, wherein the fractional precipitation takes place from a solution of a halogenated hydrocarbon.

7. The process of claim 4, wherein the degradation salt is poly-4-vinylpyridinium hydrochloride.

8. A process according to claim 5, wherein the trimer is separated by means of precipitation from ethanol.

9. A process according to claim 6, wherein the trimer is separated by means of precipitation from a chloroform solution.

10. A process according to claim 4, wherein the free trimer is purified by crystallization from methylethylketone.

11. A process according to claim 4, wherein the poly-4-vinylpyridine employed is obtained by means of radical-induced polymerization.

12. A process according to claim 4, wherein the poly-4-vinylpyridine employed is obtained in the presence of coordinate anionic catalysts.

No references cited.

WALTER A. MODANCE, *Primary Examiner.*

ALAN L. ROTMAN, *Assistant Examiner.*